US008323533B2

(12) United States Patent
Lim et al.

(10) Patent No.: US 8,323,533 B2
(45) Date of Patent: Dec. 4, 2012

(54) COMPOSITION FOR MANUFACTURING INDURATIVE RESIN, INDURATIVE RESIN MANUFACTURED BY THE COMPOSITION AND INK COMPOSITION COMPRISING THE RESIN

(75) Inventors: Min-Young Lim, Sungnam-si (KR); Jae-Joon Kim, Daejeon (KR); Mi-Ae Kim, Daejeon (KR); Dae-Hyun Kim, Goyang-si (KR); Han-Soo Kim, Daejeon (KR); Yoon-Hee Heo, Daejeon (KR); Ji-Heum Yoo, Daejeon (KR); Sung-Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 188 days.

(21) Appl. No.: 12/450,656

(22) PCT Filed: Apr. 11, 2008

(86) PCT No.: PCT/KR2008/002058
§ 371 (c)(1),
(2), (4) Date: Oct. 5, 2009

(87) PCT Pub. No.: WO2008/127039
PCT Pub. Date: Oct. 23, 2008

(65) Prior Publication Data
US 2010/0051883 A1  Mar. 4, 2010

(30) Foreign Application Priority Data
Apr. 12, 2007  (KR) ........................ 10-2007-0036135

(51) Int. Cl.
*G02B 5/23* (2006.01)
*G02F 1/1335* (2006.01)
(52) U.S. Cl. ........ 252/586; 349/106; 349/107; 349/138; 428/1.1; 428/220; 430/7; 430/270.1; 524/599; 525/190; 528/361
(58) Field of Classification Search .................. 252/586, 252/385, 393; 428/195.1, 1.1, 220; 427/256; 524/548, 599, 385, 386, 340; 525/190; 528/361; 106/31.27, 31.43, 31.51, 31.58, 31.75, 31.8, 106/31.86; 349/106, 107, 138; 430/7, 270.1
See application file for complete search history.

(56) References Cited

U.S. PATENT DOCUMENTS

| 6,727,042 B2* | 4/2004 | Takagi et al. .............. 430/280.1 |
| 2004/0029044 A1 | 2/2004 | Severance et al. |
| 2005/0072519 A1 | 4/2005 | Johnson et al. |
| 2005/0191580 A1* | 9/2005 | Takahashi et al. ......... 430/270.1 |
| 2009/0061167 A1* | 3/2009 | Nishida et al. ............. 428/195.1 |

FOREIGN PATENT DOCUMENTS

FI  WO00/59982  * 10/2000
(Continued)

*Primary Examiner* — Bijan Ahvazi
(74) *Attorney, Agent, or Firm* — McKenna Long & Aldridge, LLP

(57) ABSTRACT

The present invention relates to a composition for preparing a curable resin, comprising a) a compound represented by Formula 1; b) glycidyl (meth)acrylate; c) acid monoanhydride; and d) a solvent, a curable resin manufactured by the composition, and an ink composition comprising the same. The curable resin has a low viscosity and excellent flow properties, and the ink composition is excellent in terms of storage stability, heat resistance and chemical resistance.

15 Claims, 2 Drawing Sheets

FOREIGN PATENT DOCUMENTS

| | | |
|---|---|---|
| JP | 59-075205 | 4/1984 |
| JP | 61-245106 | 10/1986 |
| JP | 05-224007 | 9/1993 |
| JP | 07-188596 | 7/1995 |
| JP | 08-171010 | 7/1996 |
| JP | 10-017813 | 1/1998 |
| JP | 10-306149 | 11/1998 |
| JP | 2002-173518 | 6/2002 |
| JP | 2006-124531 | 5/2006 |
| KR | 10-2005-0095578 | 9/2005 |
| KR | 10-2006-0060923 | 6/2006 |
| WO | WO 2006/103976 | 10/2006 |

\* cited by examiner

[DRAWINGS]
[Figure 1]
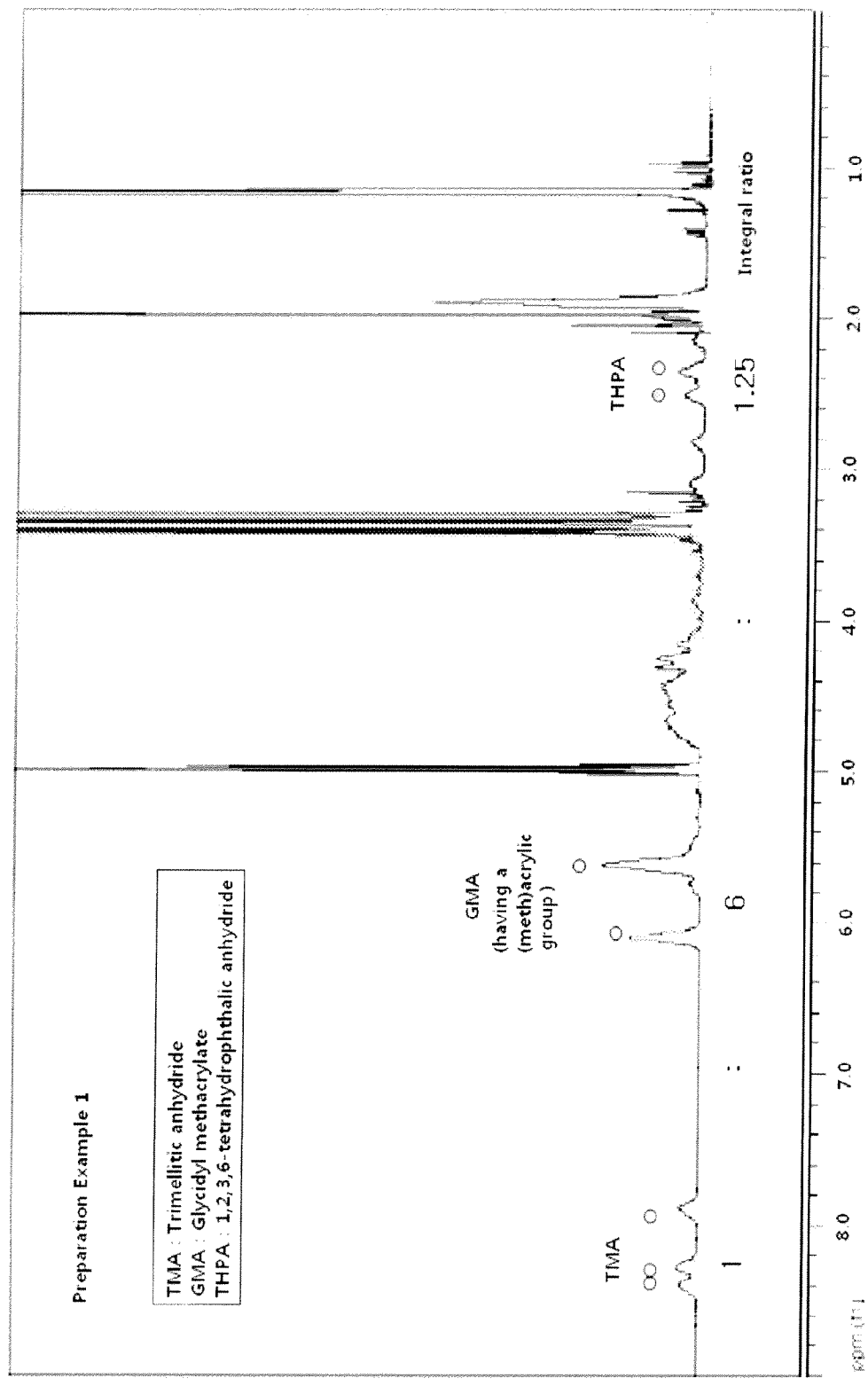

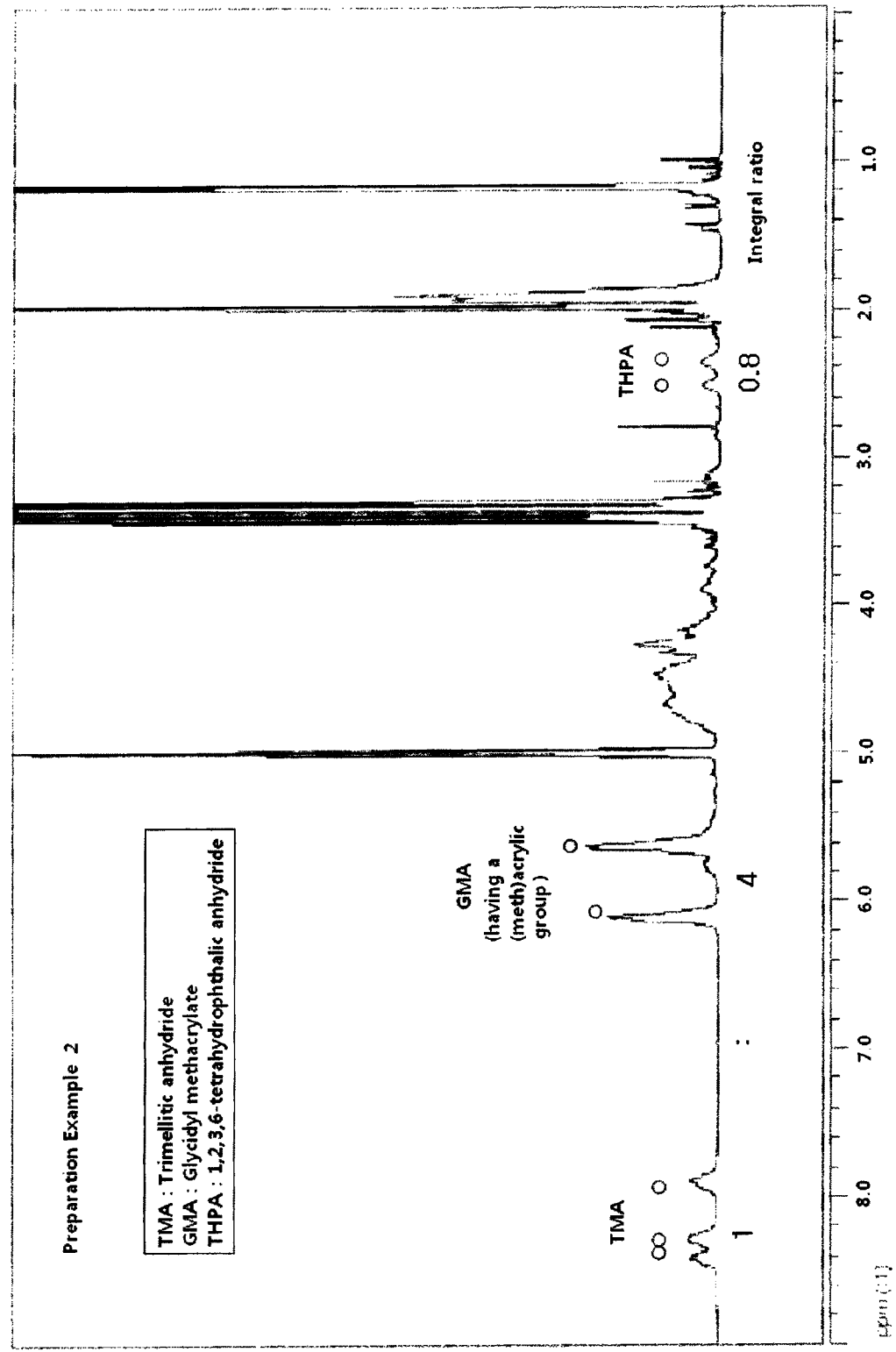

COMPOSITION FOR MANUFACTURING INDURATIVE RESIN, INDURATIVE RESIN MANUFACTURED BY THE COMPOSITION AND INK COMPOSITION COMPRISING THE RESIN

This application claims the benefit of PCT/KR2008/002058 filed on Apr. 11, 2008 and Korean Patent Application No. 10-2007-0036135 filed on Apr. 12, 2007, both of which are hereby incorporated herein by reference for all purposes in their entirety.

TECHNICAL FIELD

The present invention relates to a composition for preparing a curable resin, a curable resin prepared by the composition, and an ink composition comprising the same.

This application claims priority benefits from Korean Patent Application No. 10-2007-0036135, filed on Apr. 12, 2007, the entire content of which is fully incorporated herein by reference.

BACKGROUND ART

A color filter used in a conventional liquid crystal display or the like is manufactured by methods such as a pigment dispersion method, a dyeing method, an electrodeposition method, a printing method, and an ink-jetting method.

Recently, the pigment dispersion method is mainly used. However, this method comprises steps applying a photopolymerizable colored composition to a substrate, exposing the substrate to radiation energy through a pattern-mask, dissolving the non-required portion, and washing, which are repeated for each red, green, and blue pixels, thereby to form a color filter. Thus, the pigment dispersion method has a disadvantage of high production cost. On the other hand, the ink-jet printing method, which can form three pixels in one step, has received much attention because of its simplicity and low cost due to high efficiency of coloring materials.

For example, although methods of forming a color filter by the ink-jet printing method are disclosed in Japanese Unexamined Patent Application Publication Nos. S59-75205 and S61-245106, the color filters obtained by these methods are inferior in heat resistance and solvent resistance because the coloring material consists of a dye. On the other hand, various methods using a resin and a pigment have been proposed as the method of producing a colored layer having excellent heat resistance and solvent resistance.

For example, Japanese Unexamined Patent Application Publication No. H5-224007 discloses a color filter using ink-jet printing ink comprising a melamine resin and a colorant, and Japanese Unexamined Patent Application Publication No. H8-171010 discloses a color filter using thermosetting or photocurable ink-jet printing ink containing an acrylamide polymer.

In addition, Japanese Unexamined Patent Application Publication No. H10-17813 discloses a color filter using ink-jet ink consisting mainly of a melamine resin, a polycarboxylic acid derivative, and an amine stabilizer, and Japanese Unexamined Patent Application Publication No. H7-188596 discloses ink for thermosetting ink-jet recording using a thermosetting resin and a specific amine as a dispersant.

In general, as a curable resin, a composition consisting of an acryl resin containing a carboxylic group or epoxy group, a multifunctional monomer having an ethylenically unsaturated group, which functions as a crosslinking agent, and a thermal polymerization initiator has been mainly used.

The conventional thermosetting resin composition containing the curable resin has not excellent mechanical properties; in particular, yellowing occurs at high temperature due to the inferior heat resistance.

Accordingly, to prevent such problems, an excessive amount of multifunctional monomer having an ethylenically unsaturated group is used, which accelerates yellowing at high temperature.

In addition, to improve mechanical properties and heat resistance, there are methods for introducing an ethylenically unsaturated group into the curable resin for the purpose of crosslinking with a crosslinking agent upon thermal curing.

In this connection, to introduce the ethylenically unsaturated group into the curable resin, methods for introducing an acrylic group in a molecule are used, such as 1) addition of glycidyl(meth)acrylate to a linear polymer copolymerized with (meth)acrylic acid, 2) addition of (meth)acrylic acid to a linear polymer copolymerized with glycidyl(meth)acrylate, 3) addition of isocyanate alkyl(meth)acrylate to a linear polymer copolymerized with hydroxyalkyl(meth)acrylate, and 4) condensation of a diol compound containing an ethylenically unsaturated group and a dianhydride compound.

However, among those methods, since the methods of 1) to 3) comprises two steps of preparing a linear polymer and introducing an acrylic group, they requires longer reaction time, and the introduced (meth)acrylic equivalent is generally within 10 wt % (wherein (meth)acrylic equivalent is defined as a percentage, calculated by dividing the amount of the introduced acrylic ($CH_2=CH-CO_2-$) or methacrylic ($CH_2=CCH_3-CO_2-$) by the total weight of resin).

The method 4) also requires longer reaction time to obtain a satisfactory molecular weight, and a step of synthesizing a diol compound containing an ethylenically unsaturated group by the addition reaction of a diglycidyl compound and (meth)acrylic acid, if necessary. Further, the introduced (meth)acrylic equivalent is not above 10 wt %.

Further, in the case of using acrylic based copolymers generally used in the art as a curable resin, its molecular weight or the type of monomer is changed to control the flow properties of acrylic based copolymers. However, there is a limitation in that the structure of the acrylic based copolymer is not changed. Thus, there is a need for a resin having a completely different structure.

In the case of using a thermosetting resin such as a melamine resin, since an organic or inorganic acid or an amine or ammonium salt thereof is used in combination with a curing accelerator in the ink, these compounds remain as impurities in the film, thereby contaminating the sputtering apparatus upon formation of ITO transparent electrodes or such an ink has a short pot life when it is made as an ink in one package type.

In addition, in the case of using a solvent having a low boiling point of 200° C. or less upon manufacturing a color filter, it easily evaporates due to the characteristics of ink-jet printing method to increase the particle size of dispersed pigment, leading to a clogged printer head nozzle.

However, in the case of using a solvent having a boiling point of 200° C. or higher in order to prevent the problem, the viscosity of the solvent is increased, which is not suitable for ink. Since the problem reduces production efficiency of the color filter, it becomes a factor to impede the production efficiency, which is a major advantage of the printing method. Further, since the solvent having a relatively high boiling point has a strong intermolecular attractive force, it has a high viscosity and is not compatible with general polymer resins. Thus, there is an increasing need for the development of a solvent having a high boiling point and low viscosity as an ink solvent, and a resin which is compatible with the solvent and does not increase the viscosity of the ink composition.

During production process, the color filter is treated under severe conditions including the treatment with an organic solvent, acid, an alkali solution or the like, and heat treatment of the local surface by sputtering at high temperature. Accordingly, the curable resin used in the color filter is required to have excellent chemical resistance such as solvent resistance, acid resistance, and alkali resistance, excellent heat resistance and light resistance.

DISCLOSURE OF INVENTION

Technical Problem

It is an object of the present invention to provide a composition for preparing a curable resin having low viscosity and improved flow properties, a curable resin prepared by the composition, and an ink composition having excellent storage stability, heat resistance and chemical resistance, comprising the same.

Technical Solution

In order to achieve the above object, the present invention provides a composition for preparing a curable resin, comprising a) a compound represented by the following Formula 1; b) glycidyl (meth)acrylate; c) an acid monoanhydride; and d) a solvent.

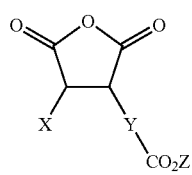

[Formula 1]

wherein X is hydrogen, $C_1$~$C_6$ alkoxy, phenoxy, $C_1$~$C_{10}$ alkyl unsubstituted or substituted with halogen, $C_2$~$C_{10}$ alkenyl containing 1 to 3 double bonds, phenyl, naphthyl, or anthracenyl, Y is $C_1$~$C_6$ alkoxy, phenoxy, $C_1$~$C_{10}$ alkylene unsubstituted or substituted with halogen, $C_2$~$C_{10}$ alkenylene containing 1 to 3 double bonds, or phenylene, X and Y may be connected to each other to form a $C_5$~$C_{12}$ ring, and Z is hydrogen, or straight or branched $C_1$~$C_{10}$ alkyl which is substituted with a carboxyl group.

Further, the present invention provides a curable resin produced by condensation polymerization of the composition for preparing a curable resin.

Further, the present invention provides a method for preparing a curable resin, comprising the step of performing a condensation reaction of the composition for preparing a curable resin at 100 to 150° C. for 1 to 24 hrs.

Further, the present invention provides an ink composition, comprising 1) the curable resin;
2) a polymerizable compound having an ethylenically unsaturated bond;
3) a thermal polymerization initiator; and
4) a solvent.

Advantageous Effects

By using the composition for preparing a curable resin according to the present invention, a curable resin having a high (meth)acrylic equivalent of 15 wt % or more can be readily prepared through one-step or two-step reaction in a short time, thereby remarkably reducing its production cost, and preparing a highly sensitive ink composition due to the high (meth)acrylic equivalent.

The curable resin prepared by using the composition for preparing a curable resin according to the present invention has low viscosity and improved flow properties, thereby being useful for the ink preparation.

Further, the curable resin according to the present invention is useful for preparing an ink composition which has excellent storage stability, heat resistance, and chemical resistance.

BRIEF DESCRIPTION OF THE DRAWINGS

FIG. 1 is NMR spectrum data of the curable resin solution of Preparation Example 1; and FIG. 2 is NMR spectrum data of the curable resin solution of Preparation Example 2.

BEST MODE FOR CARRYING OUT THE INVENTION

Hereinafter, the composition for preparing a curable resin of the present invention will be described in detail.

In the composition for preparing a curable resin according to the present invention, the compound a) represented by Formula 1 is a compound having both an acid group and an acid anhydride group.

The a) compound represented by Formula 1 may be selected from the compounds represented by the following Formulae 2 to 9:

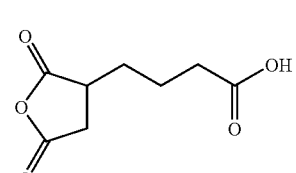

Formula 2

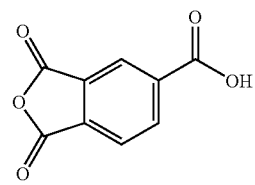

Formula 3

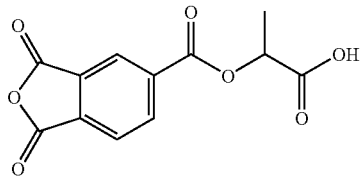

Formula 4

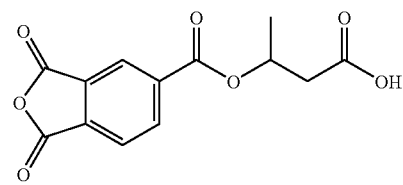

Formula 5

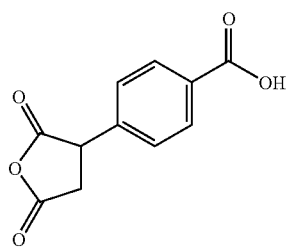

Formula 6

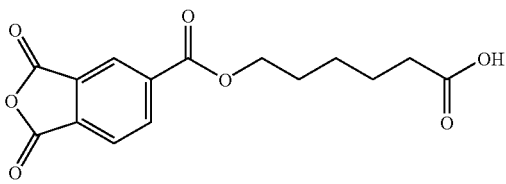

Formula 7

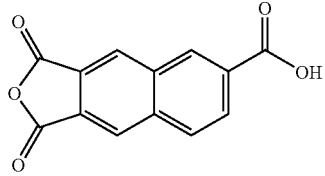

Formula 8

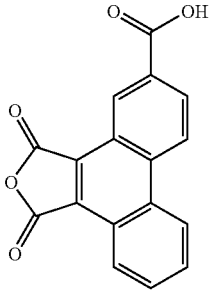

Formula 9

Preferably, the a) compound represented by Formula 1 is the compound represented by Formula 3.

An acid group of the compound represented by Formula 1 induces the open ring reaction by attacking a glycidyl group of glycidyl (meth)acrylate b), resulting in both a (meth) acrylic group and an alcohol group. The produced alcohol group binds with the acid anhydride group of Formula 1 or the anhydride group of the acid monoanhydride c) to generate an ester group and an acid group. Subsequently, the produced acid group may be reacted with glycidyl (meth)acrylate b).

As the above described reaction proceeds, the molecular weight increases, and monomers are exhausted, leading to reaction termination.

At this time, the molecular weight and acid value of the produced curable resin may be controlled by adjusting the molar ratio of a) compound represented by Formula 1, b) glycidyl (meth)acrylate, and c) acid monoanhydride. By using only the a) compound represented by Formula 1 and b) glycidyl (meth)acrylate, the curable resin can be obtained, however, c) acid monoanhydride is added to easily achieve the desirable molecular weight and acid value.

The molar ratio of a) compound represented by Formula 1 to b) glycidyl (meth)acrylate ranges from 5:1 to 0.2:1. In the case of using a higher amount of the a) compound represented by Formula 1 relative to b) glycidyl (meth)acrylate, the molecular weight decreases, and the unreacted a) compound represented by Formula 1 remains to increase the acid value.

In contrast, in the case of using an excessive amount of b) glycidyl (meth)acrylate relative to the a) compound represented by Formula 1, the molecular weight increases, and the acid value excessively reduced, as well as the unreacted b) glycidyl (meth)acrylate may remain.

Accordingly, in order to control the physical properties of the curable resin, an additional ingredient is needed. That is, the c) acid monoanhydride is added to effectively control the molecular weight and acid value of the curable resin. The c) acid monoanhydride is preferably added in a molar ratio of 0.1 to 1, based on 1 mole of the a) compound represented by Formula 1.

In the case of adding the c) acid monoanhydride of less than 0.1 mole, a sufficient acid group cannot be generated, and the molecular weight increases. In the case of adding the c) acid monoanhydride of more than 1 mole, too much acid group is introduced, and the molecular weight decreases.

Upon preparing the curable resin by performing a condensation reaction of the composition for preparing a curable resin according to the present invention, since the c) acid monoanhydride may inhibit the condensation reaction, it may be used for controlling the molecular weight and acid value of the curable resin.

Examples of the c) acid monoanhydride may include one or more selected from the group consisting of succinic anhydride, glutaric anhydride, methyl succinic anhydride, maleic anhydride, methyl maleic anhydride, phthalic anhydride, 1,2,3,6-tetrahydrophthalic anhydride, 3,4,5,6-tetrahydrophthalic anhydride, hexahydrophthalic anhydride, and cis-5-norbornene-(endo, exo)-2,3-dicarboxylic anhydride.

The d) solvent is not specifically limited, as long as it does not contain a hydroxyl group and carboxylic acid group, and may be selected from solvents generally used in the art.

The composition for preparing a curable resin according to the present invention may further comprise at least one of e) a reaction catalyst and f) a thermal polymerization inhibitor.

The condensation reaction is more easily facilitated by the addition of a small amount of e) reaction catalyst.

The e) reaction catalyst may include catalysts generally used for condensation reaction in the art, for example, may include one or more selected from basic catalysts such as alkylammonium salt, triphenylphosphine, triphenylantimony and dimethyl-laminopyridine. The e) reaction catalyst is preferably added in an amount of 0.5~2.0 wt %, based on the total weight of the a) compound represented by Formula 1.

In the case of using the e) reaction catalyst of less than 0.5 wt %, the reaction does not sufficiently proceed to decrease the reaction rate. In the case of using the e) reaction catalyst of more than 2.0 wt %, a side reaction may proceed or physical properties such as storage stability may be affected.

The condensation reaction is preferably performed in a temperature range of 100 to 150° C. for 1 to 24 hrs, preferably 1 to 10 hrs with respect to reaction rate and productivity.

In the above temperature range, since ethylene groups added by condensation reaction may generate gelation through thermal polymerization, the f) thermal polymerization inhibitor may be used in the polymerization reaction.

The f) thermal polymerization inhibitor may include one or more selected from 4-methoxyphenol (MEHQ) and 2,6-di-t-butyl-4-methylphenol. The f) thermal polymerization inhibitor is preferably added in an amount of 0.05 wt % to 0.2 wt %, based on the total weight of a), b) and c) acid monoanhydride.

In the case of adding the f) thermal polymerization inhibitor of less than 0.05 wt %, the storage stability of the curable resin may be reduced. In the case of adding the f) thermal polymerization inhibitor of more than 0.2 wt %, the physical properties such as storage stability may be affected.

The composition for preparing a curable resin according to the present invention may prepare a reactive curable resin having (meth)acrylic groups involved in thermal curing in a short time, and a solution containing the curable resin has very low viscosity due to the structural effect. In the case where the curable resin prepared by the composition for preparing a curable resin is used as a binder of an ink composition, an ink composition having excellent storage stability, heat resistance and chemical resistance may be obtained.

As mentioned above, the present invention provides a curable resin prepared by condensation of the composition for preparing a curable resin.

It is preferable that the curable resin has an acid value of 5 to 200 KOH mg/g.

In addition, the curable resin preferably has a weight-average molecular weight of 1,000 to 100,000, and more preferably 2,000 to 30,000.

In the case where the weight-average molecular weight of the curable resin is less than 1,000, the binding function between ingredients, required as a binder polymer, is weak, the loss of pattern may occur due to external force upon development, and physical properties such as storage stability, heat resistance and chemical resistance, required for the color filter pattern, are not satisfactory. On the other hand, in the case where the weight-average molecular weight of the curable resin is more than 100,000, the viscosity increases to deteriorate process characteristics, and it may be not suitable for the ink composition.

It is preferable that the curable resin has a (meth)acrylic equivalent of 15 wt % or more.

The curable resin according to the present invention is one of hyperbranched polymers, and has lower viscosity, relative to molecular weight and acid value, and excellent flow properties to easily control the viscosity, thereby being useful for the ink composition.

In the case of preparing the curable resin using the composition for preparing a curable resin according to the present invention, the curable resin having a high (meth)acrylic equivalent of 15 wt % or more can be easily prepared by one step reaction in a short time. Since the reaction is terminated within 10 hrs, the preparation cost for the binder resin can be remarkably reduced, and due to the high (meth)acrylic equivalent, the curable resin according to the present invention can be used as a binder resin of ink composition, having excellent heat resistance.

Further, the present invention provides a method for preparing a curable resin, comprising the step of performing a condensation reaction of the composition for preparing a curable resin at 110 to 150° C. for 1 to 24 hrs. As such, the ingredients a) to d) are simultaneously added to perform the condensation reaction, thereby preparing the curable resin. The reaction temperature and the reaction time are not limited, but may be controlled according to reaction mechanism.

For example, the curable resin may be prepared by the method comprising the steps of (1) adding 20~500 mole of glycidyl (meth)acrylate b), 10~100 mole of acid monoanhydride c), and a solvent having no carboxylic acid group d) to 100 mole of ingredient a); and (2) heating and stirring at 80 to 130° C. for 4 to 24 hrs.

In another method, the ingredients a) and b) are first added to increase the molecular weight, and then acid groups are introduced to prepare the curable resin. The curable resin may be prepared by the method comprising the steps of (1) adding 20~500 mole of glycidyl (meth)acrylate b) and a solvent having no carboxylic acid group d) to 100 mole of ingredient a); (2) heating at 80 to 130° C. for 4 to 24 hrs; and (3) adjusting the reaction temperature to 70 to 110° C., adding 10~100 mole of acid monoanhydride c), and stirring for 4 to 24 hrs.

In addition, the present invention provides an ink composition comprising 1) the produced curable resin; 2) a polymerizable compound having an ethylenically unsaturated bond; 3) a thermal polymerization initiator; and 4) a solvent.

In this connection, it is preferable that the ink composition comprises 1) the curable resin of 1 to 20 parts by weight; 2) the polymerizable compound having an ethylenically unsaturated bond of 0.5 to 20 parts by weight; 3) the thermal polymerization initiator of 0.1 to 5 parts by weight; and 4) the solvent of 55 to 95 parts by weight, based on 100 parts by weight of the ink composition.

Examples of 2) the polymerizable compound having an ethylenically unsaturated bond may include one or more selected from group consisting of compounds obtained by esterification of α,β-unsaturated carboxylic acid with polyol such as ethyleneglycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate having 2 to 14 propylene groups, dipentaerythritol penta(meth)acrylate, dipentaerythritol hexa(meth)acrylate; compounds obtained by adding (meth)acrylic acid to compounds containing glycidyl groups such as trimethylolpropane triglycidyletheracrylic acid additive and bisphenol A diglycidyletheracrylic acid adducts; compounds obtained by adding compounds having an ethylenically unsaturated bond and hydroxyl group to a polyhydroxycarboxylic acid, such as phthalic acid diester of β-hydroxyethyl(meth)acrylate, or compounds obtained by adding compounds having an ethylenically unsaturated bond and hydroxyl group to polyisocyanate, such as a compound obtained from a toluene diisocyanate adduct of β-hydroxyethyl (meth)acrylate; (meth)acrylic acid alkylester such as methyl(meth)acrylate, ethyl(meth)acrylate, butyl(meth)acrylate, and 2-ethylhexyl(meth)acrylate; and 9,9'-bis[4-(2-acryloyloxyethoxy)phenyl]fluorene, but are not limited thereto, and include ones known in the art without limitations. If necessary, these compound may contain a silica dispersion, for example, Nanocryl XP series (0596, 1045, 21/1364) and Nanopox XP series (0516, 0525) manufactured by Hanse Chemie.

Examples of the 3) thermal polymerization initiator may include one or more selected from the group consisting of 2-2'-azobisisobutyronitrile (ATBN), 2,2'-azobis-(2,4-dimethylvaleronitrile), 2,2'-azobis-(4-methoxy-2,4-dimethylvaleronitrile), 2-cyano-2-propylazoformamide, 1,1'-azobis(cyclohexane-1-carbonitrile), 2,2'-azobis(2-methylbutyronitrile), V-40, VA-086, VA-085, VF096, VAm-110, Vam-111 (manufactured by Wako pure chemicals ind.), benzoyl peroxide, lauroyl peroxide, t-butylperoxypivalate, and 1,1'-bis-(bis-t-butylperoxy)cyclohexane, but include ones known in the art without limitations.

Examples of the 4) solvent may include one or mixtures of two or more, selected from dipropyleneglycol monomethyletheracetate (DPMA), methyl ethyl ketone, methylcellosolve, ethylcellosolve, ethyleneglycol dimethyl ether, ethyleneglycol diethyl ether, propyleneglycol dimethyl ether, propyleneglycol diethyl ether, diethyleneglycol dimethylether, diethyleneglycol diethylether, diethyleneglycol methyl ethyl ether, 2-ethoxy propanol, 2-methoxy propanol, 3-methoxy butanol, cyclohexanone, cyclopentanone, propyleneglycol methyl ether acetate, propyleneglycol, ethyl ether acetate, 3-methoxybutyl acetate, ethyl 3-ethoxypropionate, ethyl cellosolveacetate, methyl cellosolveacetate, butyl acetate, and dipropyleneglycol monomethyl ether, but include ones known in the art without limitations.

The ink composition according to the present invention may further include a 5) coloring agent.

The 5) coloring agent is preferably contained in an amount of 0.5 to 20 parts by weight, based on 100 parts by weight of the ink composition.

As the 5) coloring agent, pigments, dyes or mixtures thereof may be used.

Examples of the coloring agent may include carmine 6B (C.I.12490), phthalocyanine green (C.I. 74260), phthalocyanine blue (C.I. 74160), perylene black (BASF K0084. K0086), cyanine black, lionol yellow (C.I.21090), lionol yellow GRO (C.I. 21090), benzidine yellow 4T-564D, victoria pure blue (C.I.42595), C.I. PIGMENT RED 3, 23, 97, 108, 122, 139, 140, 141, 142, 143, 144, 149, 166, 168, 175, 177, 180, 185, 189, 190, 192, 202, 214, 215, 220, 221, 224, 230, 235, 242, 254, 255, 260, 262, 264, 272; C.I. PIGMENT GREEN 7, 36; C.I. PIGMENT blue 15:1, 15:3, 15:4, 15:6, 16, 22, 28, 36, 60, 64; C.I. PIGMENT yellow 13, 14, 35, 53, 83, 93, 95, 110, 120, 138, 139, 150, 151, 154, 175, 180, 181, 185, 194, 213; and C.I. PIGMENT VIOLET 15, 19, 23, 29, 32, 37. In addition thereto, a white pigment and a fluorescent pigment may be used as well, but include ones known in the art without limitations.

Further, the ink composition according to the present invention may further include 6) a additive. The 6) additive may include one or more selected from a thermosetting accelerator, an adhesion accelerator, a filler, and a surfactant, but include ones known in the art without limitations.

The 6) additive is preferably contained in an amount of 0.01 to 20 parts by weight, based on 100 parts by weight of the ink composition.

Further, the present invention provides a color filter, formed using the ink composition according to the present invention.

The color filter according to the present invention may be formed using the ink composition according to the present invention by an ink-jet or offset printing method.

Further, the present invention provides an electronic device comprising the color filter according to the present invention. In this connection, the electronic device may be a variety of display devices, but is not limited thereto.

Mode for the Invention

Hereinafter, the present invention will be described in detail with reference to Examples.

Examples are provided only for the purpose of illustrating the present invention, and accordingly it is not intended that the present invention is limited thereto.

[PREPARATION EXAMPLE] PREPARATION OF CURABLE RESIN

Preparation Example 1

0.3 kg of trimellitic anhydride, 1.5 kg of glycidyl methacrylate, 0.3 kg of 1,2,3,6-tetrahydrophthalic anhydride, 7.5 kg of DPMA solvent, 32 g of tetrabutylammonium bromide, and 2 g of thermal polymerization inhibitor MEHQ were stirred under oxygen atmosphere using a mechanical stirrer at 120° C. for 10 hrs to obtain a resin solution (weight-average molecular weight (Mw): 8500, Acid Value (AV): 3).

Preparation Example 2

1.0 kg of trimellitic anhydride, 1.8 kg of glycidyl methacrylate, 0.3 kg of 1,2,3,6-tetrahydrophthalic anhydride, 7.0 kg of DPMA solvent, 40 g of tetrabutylammonium bromide, and 2 g of MEHQ were stirred under oxygen atmosphere using a mechanical stirrer at 120° C. for 10 hrs to obtain a resin solution (weight-average molecular weight (Mw): 14500, Acid Value (AV): 18)

Comparative Preparation Example 1

3.17 kg of benzyl methacrylate, 1.33 kg of methacrylic acid, 120 g of dodecanethiol, and 12.5 kg of solvent DPMA were stirred under nitrogen atmosphere using a mechanical stirrer for 30 min. The temperature of reactor was increased to 70° C. under nitrogen atmosphere. When the temperature of the mixture reached 70° C., 120 g of thermal polymerization initiator AIBN was added thereto, followed by stirring for 8 hrs. Then, the temperature of reactor was increased to 90° C., and 10 g of triphenylphosphine was added thereto. 5 g of thermal polymerization inhibitor MEHQ was added, stirred for 30 min, and then 860 g of glycidyl methacrylate was added. The temperature of reactor was increased to 110° C. under oxygen atmosphere, and stirred for 12 hrs to complete the synthesis of desired resin (weight-average molecular weight (Mw): 11,000, Acid Value (AV): 94)

Comparative Preparation Example 2

1.7 kg of trimellitic anhydride, 2.8 kg of glycidyl methacrylate, 10.5 kg of DPMA solvent, 40 g of tetrabutylammonium bromide, and 2 g of MEHQ were stirred under oxygen atmosphere using a mechanical stirrer at 120° C. for 10 hrs to obtain a resin solution (weight-average molecular weight (Mw): 3,000, Acid Value (AV): 150)

[EXAMPLE] PREPARATION OF INK COMPOSITION

Example 1

5.50 kg of dispersed solution containing 15% pigment C.I. Pigment Blue 15:6, 10% dispersing agent, 75% solvent DPMA; 1.50 kg of resin solution prepared in Preparation Example 1 (solid content 30%); 2.00 kg of dipentaerythritol hexaacrylate, which is a polymerizable compound; 50 g of thermal polymerization initiator; 35 g of fluorine-based surfactant; and 5.90 kg of organic solvent DPMA were mixed together for 3 hrs to prepare an ink composition (solid content 27%).

Example 2

5.50 kg of dispersed solution containing 15% pigment C.I. Pigment Blue 15:6, 10% dispersing agent, 75% solvent DPMA; 1.50 kg of resin solution prepared in Preparation Example 2 (solid content 30%); 2.0 kg of dipentaerythritol hexaacrylate, which is a polymerizable compound; 50 g of thermal polymerization initiator; 35 g of fluorine-based surfactant; and 5.90 kg of organic solvent DPMA were mixed together for 3 hrs to prepare an ink composition (solid content 27%).

Comparative Example 1

5.50 kg of dispersed solution containing 15% pigment C.I. Pigment Blue 15:6, 10% dispersing agent, 75% solvent DPMA; 1.2 kg of resin solution prepared in Comparative Preparation Example 1 (solid content 30%); 2.0 kg of dipentaerythritol hexaacrylate, which is a polymerizable compound; 50 g of thermal polymerization initiator, 35 g of fluorine-based surfactant; and 6.90 kg of organic solvent DPMA were mixed together for 3 hrs to prepare an ink composition (solid content 24%).

Comparative Example 2

5.50 kg of dispersed solution containing 15% pigment C.I. Pigment Blue 15:6, 10% dispersing agent, 75% solvent DPMA; 1.2 kg of resin solution prepared in Comparative Preparation Example 2 (solid content 30%); 2.0 kg of dipentaerythritol hexaacrylate, which is a polymerizable compound; 50 g of thermal polymerization initiator; 35 g of fluorine-based surfactant; and 6.90 kg of organic solvent DPMA were mixed together for 3 hrs to prepare an ink composition (solid content 24%).

Manufacturing of Color Filter Substrate

Each ink composition prepared in Examples 1 and 2, and Comparative Examples 1 and 2 was jetted into a pixel area on a black matrix pattern prepared through an ink-jetting nozzle. The ink composition for the color filter substrate was heated to 140° C. for about 15 minutes. Then, the ink composition for the color filter was heated again to 200° C. and was cured for 30 minutes to form a color pixel layer. Hence, the color filter substrate was completed.

Performance Test and Evaluation Criteria

1) Viscosity: The viscosity of each ink composition prepared in Examples 1 and 2, and Comparative Examples 1 and 2 was measured using a DV-II+ viscometer manufactured by Brookfield.

2) Storage stability: After each ink composition prepared in Examples 1 and 2, and Comparative Examples 1 and 2 was stored at 45° C. for 5 days, its viscosity was measured to evaluate the rate of change to the initial viscosity as storage stability.

O: the rate of change to the initial viscosity of less than 10%.

X: the rate of change to the initial viscosity of 10% or more.

3) Heat resistance test: The color filter substrate manufactured using each ink composition according to Examples 1 and 2, and Comparative Examples 1 and 2 was heated at 230° C. for 1 hr. Color difference and shrinkage were measured before and after heating, and heat resistance was evaluated by the following criteria.

O: color difference (ΔE*ab) of less than 3

X: color difference (ΔE*ab) of 3 or more

4) Chemical resistance test: Using NMP (N-Methyl pyrrolidone), the color filter substrate manufactured using each ink composition according to Examples 1 and 2, and Comparative Examples 1 and 2 was left at 45° C./25° C. for 1 hr, and then change of thickness was observed to evaluate chemical resistance. When the color filter substrate put at room temperature for 1 hr, the swelling ratio of 103% or less was determined as good, and the swelling ratio of 103% or more was determined as defective.

The results of evaluation are shown in Table 1.

TABLE 1

| | Storage stability | | | Heat resistance | | Chemical resistance | |
|---|---|---|---|---|---|---|---|
| | 45° C., | | | | | | |
| | Initial | after 5 days | Evaluation | color difference | Evaluation | swelling ratio | Evaluation |
| Example 1 | 12.1 | 12.3 | O | 1.71 | O | 103% | O |
| Example 2 | 12.7 | 12.7 | O | 1.43 | O | 103% | O |
| Comparative Example 1 | 14.3 | 14.4 | O | 3.12 | X | 104% | X |
| Comparative Example 2 | 13.2 | 13.8 | X | 2.03 | O | 104% | X |

As shown in Table 1, from the result of storage stability test, the ink composition according to Comparative Example 1 was found to have little change, but the color filter substrate manufactured using the ink composition according to Comparative Example 1 was found to be defective in heat resistance and chemical resistance. Further, the color filter substrate manufactured using the ink composition according to Comparative Example 2 was found to have a color difference (ΔE*ab) of less than 3 as a result of heat resistance evaluation. However, as a result of evaluating storage stability and chemical resistance, the ink composition according to Comparative Example 2 and the color filter substrate manufactured using the ink composition according to Comparative Example 2 were found to be defective.

In contrast, the ink composition according to Examples 1 and 2 of the present invention, and the color filter substrate manufactured by the same were found to have excellent storage stability, heat resistance, and chemical resistance.

Accordingly, using the composition for preparing a curable resin according to the present invention, the ink composition having excellent storage stability, heat resistance and chemical resistance can be provided.

The invention claimed is:

1. A curable resin manufactured by condensation of a composition, wherein the composition comprises:

a) a compound represented by the following Formula 1;

b) glycidyl (meth)acrylate;

c) acid monoanhydride; and
d) a solvent:

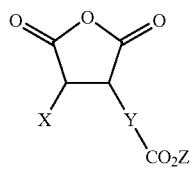

wherein X is hydrogen, $C_1$-$C_6$ alkoxy, phenoxy, $C_1$-$C_{10}$ alkyl unsubstituted or substituted with halogen, $C_2$-$C_{10}$ alkenyl containing 1 to 3 unsaturated groups, phenyl, naphthyl, or anthracenyl, Y is $C_1$-$C_6$ alkoxy, phenoxy, $C_1$-$C_{10}$ alkylene unsubstituted or substituted with halogen, $C_2$-$C_{10}$ alkenylene containing 1 to 3 unsaturated groups, or phenylene, X and Y may be connected to each other to form a $C_5$-$C_{12}$ ring, and Z is hydrogen, or straight or branched $C_1$-$C_{10}$ alkyl which is substituted with a carboxyl group;

wherein a molar ratio of the ingredients a) and b) is 5:1 to 0.2:1 and the c) acid monoanhydride is contained in a molar ratio of 0.1 to 1, based on 1 mole of the a) compound, and wherein the curable resin has a weight-average molecular weight of 1,000 to 100,000, and an acid value of 5 to 200 KOH mg/g, and having a (meth)acrylic equivalent of 15 wt % or more.

2. The curable resin according to claim 1, wherein the a) compound represented by Formula 1 is selected from the group consisting of the compounds represented by the following Formulae 2 to 9:

Formula 2

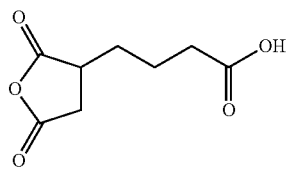

Formula 3

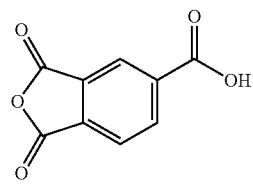

Formula 4

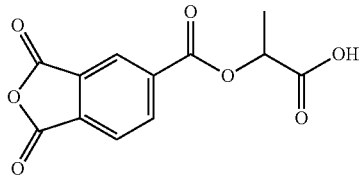

Formula 5

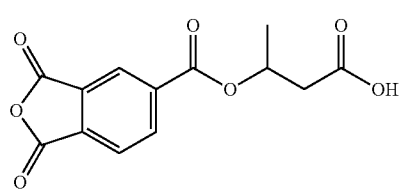

Formula 6

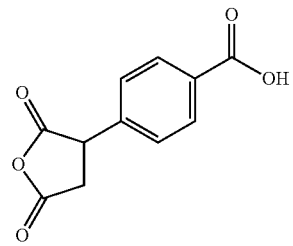

Formula 7

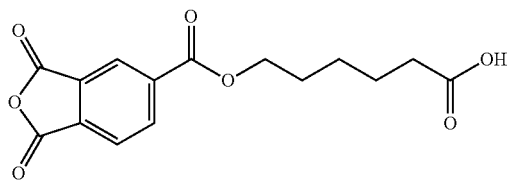

Formula 8

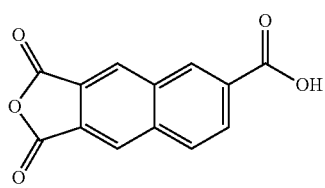

Formula 9

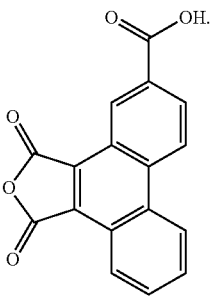

3. The curable resin according to claim 1, wherein the c) acid monoanhydride is selected from the group consisting of succinic anhydride, glutaric anhydride, methyl succinic anhydride, maleic anhydride, methyl maleic anhydride, phthalic anhydride, 1,2,3,6-tetrahydrophthalic anhydride, 3,4,5,6-tetrahydrophthalic anhydride, hexahydrophthalic anhydride, cis-5-norbornene-(endo, exo)-2,3-dicarboxylic anhydride, and combinations thereof.

4. The curable resin according to claim 1, wherein the composition further comprises at least one of e) a reaction catalyst and f) a thermal polymerization inhibitor.

5. The curable resin according to claim 4, wherein the e) reaction catalyst is selected from alkylammonium salt, triphenylphosphine, triphenylantimony, dimethylaminopyridine, and combinations thereof.

6. The curable resin according to claim 4, wherein the f) thermal polymerization inhibitor is selected from 4-methoxyphenol (MEHQ), 2,6-di-t-butyl-4-methylphenol, and combinations thereof.

7. A method for preparing a curable resin according to claim 1, comprising the step of performing a condensation reaction of the composition at 100 to 150° C. for 1 to 24 hrs.

8. An ink composition, comprising
1) the curable resin according to claim 1;
2) a polymerizable compound having an ethylenically unsaturated bond;

3) a thermal polymerization initiator; and
4) a solvent.

9. The ink composition according to claim 8, wherein the ink composition comprises 1) the curable resin of 1 to 20 parts by weight; 2) the polymerizable compound having an ethylenically unsaturated bond of 0.5 to 20 parts by weight; 3) the thermal polymerization initiator of 0.1 to 5 parts by weight; and 4) the solvent of 55 to 95 parts by weight, based on 100 parts by weight of the ink composition.

10. The ink composition according to claim 8, wherein the 2) polymerizable compound having an ethylenically unsaturated bond is selected from the group consisting of compounds obtained by esterification of α,β-unsaturated carboxylic acid with polyol; compounds obtained by adding (meth)acrylic acid to compounds containing glycidyl groups; ester compound obtained by esterification of a compound having a hydroxyl group or an ethylenically unsaturated bond with polyhydric carboxylic acid or polyisocyanate additive;
(meth)acrylic acid alkylester; 9,9'-bis[4-(2-acryloyloxyethoxy)phenyl]fluorene, and combinations thereof.

11. The ink composition according to claim 8, wherein the 3) thermal polymerization initiator is selected from the group consisting of 2,2'-azobisisobutyronitrile (AIBN),2,2'-azobis-(2,4-dimethylvaleronitrile), 2,2'-azobis-(4-methoxy-2,4-dimethylvaleronitrile), 2-cyano-2-propylazoformamide, 1,1'-azobis(cyclohexane-1-carbonitrile), 2,2'-azobis(2-methylbutyronitrile), V-40, VA-086, VA-085, VF096, VAm-110, Vam-111, benzoyl peroxide, lauroyl peroxide, t-butylperoxypivalate, 1,1'-bis-(bis-t-butylperoxy)cyclohexane, and combinations thereof.

12. The ink composition according to claim 8, wherein the 4) solvent is selected from dipropyleneglycol monomethyletheracetate(DPMA), methyl ethyl ketone, methylcellosolve, ethylcellosolve, ethyleneglycol dimethyl ether, ethyleneglycol diethyl ether, propyleneglycol dimethyl ether, propyleneglycol diethyl ether, diethyleneglycol dimethylether, diethyleneglycol diethylether, diethyleneglycol methyl ethyl ether, 2-ethoxy propanol, 2-methoxy propanol, 3-methoxy butanol, cyclohexanone, cyclopentanone, propyleneglycol methyl ether acetate, propyleneglycol ethyl ether acetate, 3-methoxybutyl acetate, ethyl 3-ethoxypropionate, ethyl cellosolveacetate, methyl cellosolveacetate, butyl acetate, dipropyleneglycol monomethyl ether, and combinations thereof.

13. The ink composition according to claim 8, further comprising one or more additives selected from a thermosetting accelerator, an adhesion accelerator, a filler, a coloring agent, and a surfactant.

14. A color filter formed using the ink composition according to claim 8.

15. An electronic device comprising the color filter according to claim 14.

* * * * *